April 5, 1938.     G. L. MOORE     2,112,860
LUBRICATING SYSTEM
Filed April 6, 1926
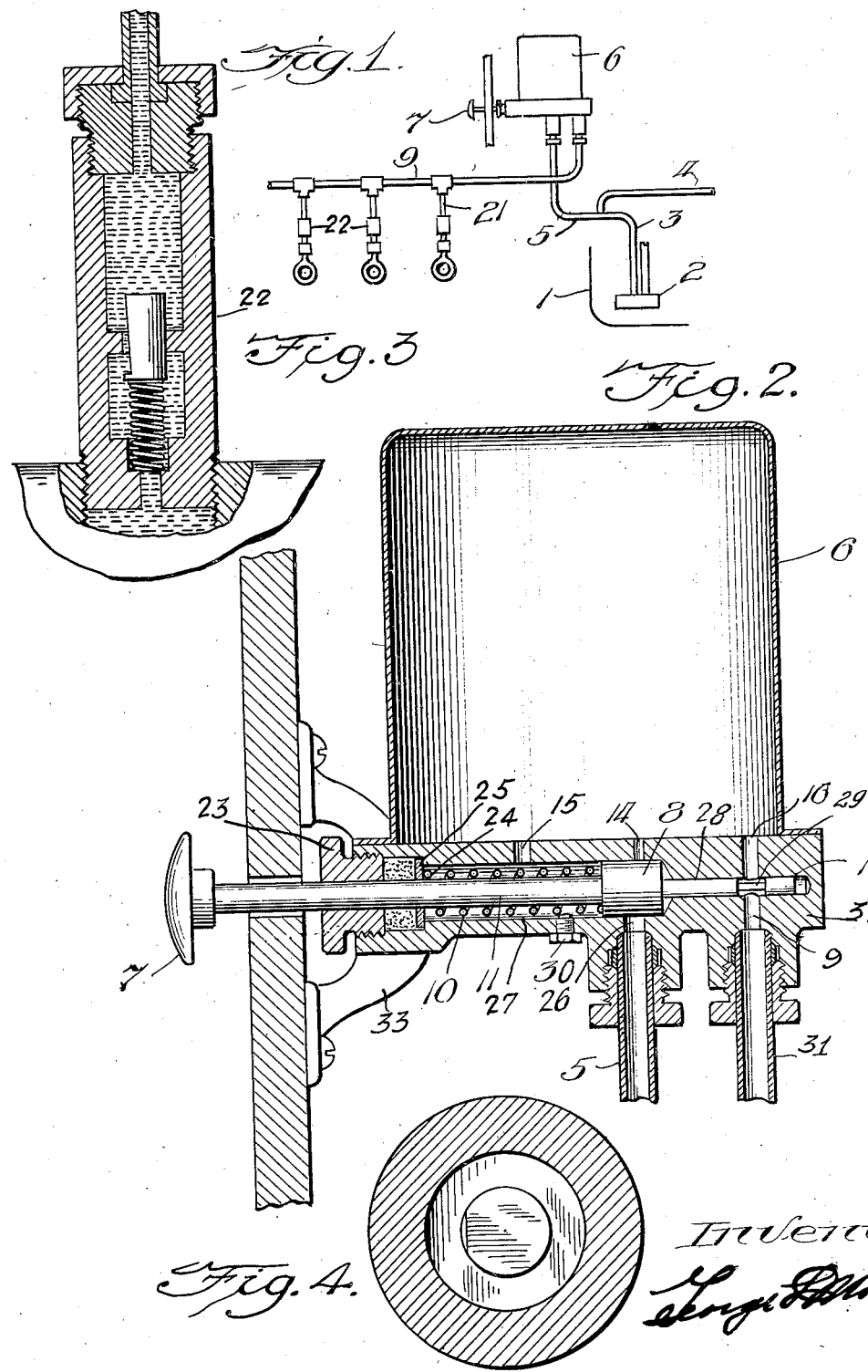

Patented Apr. 5, 1938

2,112,860

UNITED STATES PATENT OFFICE 2,112,860

LUBRICATING SYSTEM

George L. Moore, Chicago, Ill., assignor to Auto Research Corporation, a corporation of Delaware Application April 6, 1926, Serial No. 100,089

42 Claims. (Cl. 184—7)

This invention has for its object to provide an improved system for lubricating a plurality of bearings from a central source of supply.

It is common practice in such systems to supply the oil from a central reservoir to the bearings through a conduit having a branch leading to each bearing. In devices of this type some kind of flow regulating device is usually placed in each branch, as otherwise the bearing offering the least resistance to flow would receive most of the oil. I have shown an improved form of flow control device in my copending application, Serial No. 74,432, filed December 10, 1925, which has been patented as Reissue Patent No. 16,655. The present invention is especially adapted for use with systems having this type of flow control device, but it is not limited to use in that relation and it can be used with advantage in systems having other types of flow control devices or even where no control device is used and the oil is supplied directly to the bearing.

A difficulty which is encountered in the use of lubricating systems of the type described resides in the fact that if the lubricant pressure is constantly maintained the bearings are likely to get too much oil, and this cannot be entirely avoided by regulating the size of the opening in the flow control devices, because the openings would have to be so small that they would be very easily clogged up and the system would be unreliable. An attempt has been made to avoid this difficulty by placing a valve between the source of supply and the conduits, but this is not entirely satisfactory, as the operation of this valve is left to the operator, who may not be a skilled mechanic, and moreover, since the valve should be left open for some time at each operation to insure proper lubrication the operator is likely to forget it and leave it open.

It is to avoid the difficulties discussed above that the present invention has been made. I have for purposes of illustration shown the device in connection with the chassis of an automobile as the system is especially well suited for use in lubricating the chassis bearings. For a full and clear understanding of this invention reference is had to the accompanying drawing in which:

Fig. 1 is a somewhat diagrammatic showing of a system constructed according to my invention.

Fig. 2 is a sectional elevation of the pressure chamber and valve.

Figs. 3 and 4 show a preferred form of outlet fitting, Fig. 3 being a longitudinal sectional view, and Fig. 4 being a transverse sectional view.

The numeral 1 represents the wall of the lubricant reservoir of any machine of the type using force feed lubrication and might specifically be the crank case of an automobile engine. A pump 2 is driven by a moving part of the machine and may if desired be used for supplying lubricant constantly to bearings within the casing which require a constant supply of lubricant. A pipe 3 is indicated as leading to the pressure system of the engine, which is indicated by the reference numeral 4. These parts are of conventional construction, and the present invention resides in the connection to this system of my improved device, of which the following is a description such as will enable any mechanic skilled in the art to make and use the invention.

A conduit 5 is connected at one end to the pipe 3, to receive a portion of the oil delivered by the pump, and this conduit leads to the base 32 of an air chamber 6. This chamber may be mounted on the dash, the instrument board or the floor board of the automobile, or in any convenient place. In this particular embodiment it is mounted on the dash by means of a bracket 33, and the handle of the controlling valve projects through the dash to a point within convenient reach of the driver. The base 32 of the chamber is provided with means for securing it to the inverted chamber 6, such as cap screws. This means forms no part of the invention and is not shown. The base is provided with a bore to receive the controlling valve 11, the outer end of the bore is considerably larger than the stem of the valve, and a packing gland 23 is provided to prevent leakage. A washer 24 is also provided to seat against a shoulder 25 in the bore. This washer serves the double purpose of holding the packing in place against the pressure of the gland, and serving as a seat for the spring 10.

The chamber 6 is completely closed except for the fact that it communicates with the bore through the openings 14, 15 and 16, which are located as shown in Figure 2. The opening 15 communicates with the bore at a point just inside the shoulder 25, and the opening 14 is located at a point spaced inwardly from the opening 15. The bore is cylindrical in contour, and substantially larger than the valve stem at the gland and also at the portion indicated by the reference character 27 and which extends from the shoulder 25 to a point spaced inwardly from the inner side of the opening 15. The opening 16 is located at a point spaced inwardly from the opening 14 and outwardly from the inner end of the bore. The portion of the bore between the opening 14 and the opening 16 is reduced in diameter for a purpose hereinafter to be described. The conduit 5 communicates with the chamber through an opening 26. This opening is of substantially the same size as the passage through the conduit 5, but of larger size than the opening 14. The inner edges of the openings 14 and 26 are located at the same point along the axis of the bore, to allow the valve to close both openings at substantially the same time.

The valve 11 is provided with an operating handle or knob 7, and a reduced stem which connects the knob with a piston portion or slide valve 8, of such size as to slide smoothly in the cylindrical bore 27, but sufficiently tight to insure a substantially sealed closure when the valve is in position. The valve is provided with a reduced extension 28 extending inwardly from the piston portion 8 substantially to the adjacent edge of the port 16, when the valve is at its innermost position. The portion 28 is made of such diameter as to be looser in the bore than would be required for an ordinary running fit, for two reasons, first, a slight leak is desired from the cylindrical portion 27 to the outlet 9, and second, in making the bore there might be some difficulty in keeping the small inner portion concentric with the outer portion, and the necessity for this exact workmanship is obviated if the bore can be of larger size than the portion 28. The valve is provided with a further reduced portion 29, connecting the portion 28 with another portion 12. An opening 9 communicates with the bore at a point substantially opposite the opening 16. The portion 12 serves as a valve to close communication between these openings, and the parts are so proportioned that communication between the openings 9 and 16 does not occur at the same time as it occurs between the openings 14 and 26. A spring 10 is provided to hold the valve normally in the position shown in Figure 2, in which the chamber is open through the openings 16, the bore, and the opening 9 to the distributing conduit 31. This distributing conduit leads to a plurality of flow control devices 22, each of which is mounted on a part requiring lubrication. These flow control devices may be of any suitable construction, but are preferably of the type shown in my patent mentioned above and illustrated in Figs. 3 and 4.

The operation of the device is as follows: Assuming the motor of the automobile to be in operation, a pressure created by the pump 2 will exist in the conduits 3 and 5. The valve 8 is closed, and the chamber 6 is substantially filled with air. There is little if any pressure in the chamber, as the outlet 16 is open to the distributing system. When the operator desires to lubricate the chassis, he pulls the knob 7 out against the pressure of the spring until further movement is prevented by the stop 30, or by the spring itself in the absence of this stop. The oil from the pump immediately flows through the inlet 26 into the cylinder 27 and through the opening 14 into the chamber 6. Since the opening 14 is of smaller area than the inlet 26, the pressure in the cylinder 27 will be almost as high as in the conduit 5. This pressure, acting on the head of the piston 8, is sufficient to prevent the closing of the valve, unless force is applied by the operator. A very slight leak occurs through the space between the member 28 and the reduced portion of the bore, but it is so small as to be of no importance, and moreover, it flows into the distributing system and is not lost. The oil continues to flow into the chamber 6 until a pressure is built up approaching that in the conduit 5. As the pressure in the chamber increases, the fluid pressure on the inner end of the piston 8 is gradually compensated for by the pressure on the other end of the piston, and finally a point is reached at which the combined pressure in the chamber and the force of the spring overcomes the pressure on the inner end of the piston and moves the valve back across the inlet 26. At this point in the movement of the valve communication is opened through the outlet 16 of the chamber to the system 31, and since there is a slight leak around the member 28, the valve continues to move until the original position is reached. The oil is now free to flow from the chamber through the outlet 9 and into the distributing system, and the pressure of the compressed air in the chamber causes it to do so until substantially all the oil has been expelled. This operation may take some time, but it will usually be completed in a considerably shorter time than the interval which is allowed to elapse between operations, thus avoiding the difficulty of having to reduce the size of the openings in the individual flow controls to such size that they would be likely to get clogged up, and still avoiding the loss of oil and the dirty garage floors which would result from overlubrication of the bearings.

In the operation of this device the oil is delivered to the bearings under a pressure which varies from substantially pump pressure at first and which gradually diminishes to zero at the end of the operation. There is, however, no uneven feeding of oil to the bearings, as the flow control devices at each bearing vary the area of the outlet inversely with the pressure, and a substantially even feed is maintained throughout the operation. It is of course possible to use other flow control devices with this system, but the above mentioned advantage of obtaining an even flow would obviously not be secured.

From the above description and the accompanying drawing it will be seen that I have produced a new and exceptionally efficient lubricating system, which requires substantially no attention from the operator. It is obvious that the invention might be usefully embodied in any number of different forms, and accordingly I do not wish to limit myself in its use except as indicated in the following claims.

I claim:

1. A chassis lubricating system including a power driven pump, a chamber containing air and adapted to receive a predetermined quantity of lubricant under pressure from the pump to compress the air therein, and a part to be lubricated, a conduit connecting the chamber with the pump, a conduit connecting the chamber with the part to be lubricated, and manually operable valve means in said conduits, said valve means including two interconnected valves, one of said valves being opened when the other is closed.

2. A lubricating system including a source of lubricant under constant pressure, a chamber containing air and adapted to receive a predetermined quantity of oil under pressure from the source to compress the air therein, a bearing, a conduit connecting the chamber with the bearing, a conduit connecting the chamber with the source, and manually operable valve means in said conduits, said valve means including two interconnected valves, one of said valves being opened when the other is closed.

3. A lubricating system comprising a source of lubricant under constant pressure, an air chamber, a conduit leading from the source of pressure to the air chamber, a valve in said conduit, resilient means urging said valve to closed position, means for opening said valve and means preventing the immediate closing of said valve after it has been opened, whereby the discharge of a substantial quantity of lubricant at each operation of the value is assured.

4. A lubricating system comprising a source of lubricant under constant pressure, a chamber, a conduit leading from the source to the chamber, a valve in said conduit, means urging said valve to closed position, means for opening said valve and fluid pressure means preventing the immediate closing of said valve after it has been opened, whereby the discharge of a substantial quantity of lubricant at each operation of the valve is assured.

5. A lubricating system comprising a source of lubricant under constant pressure, a chamber, a bearing, a conduit from the source to the chamber, a conduit from the chamber to the bearing, a valve in one of said conduits having open and closed positions, means tending to move said valve to one of said positions, means operable to move said valve to the other of said positions, and fluid pressure means preventing the immediate return of said valve to the first named position.

6. A lubricating system comprising a source of lubricant under pressure, a storage chamber, valve controlled means for conducting the lubricant to the storage chamber, means urging said valve to closed position, means for opening said valve and means to prevent the closing of said valve after it has been opened until the pressure in the storage chamber rises to a predetermined degree.

7. A lubricating system comprising a source of lubricant under pressure, a chamber, a bearing, conduits connecting the chamber with the bearing and with the source, valve means in said conduits, each conduit having a valve, which valves are movable to open and closed positions and connected so that when one is opened, the other is closed, automatic means tending to move said valve means to one of said positions, manual means to move said valve to the other of said positions, and means set in operation upon the movement of the valve means to the last mentioned position, to temporarily prevent the operation of the automatic means to return it to the other position.

8. A lubricating system comprising a source of lubricant under pressure, means for delivering a predetermined quantity of the lubricant to a chamber, segregating it from the source and discharging it under varying pressure, means tending to expel the lubricant from the chamber, a plurality of bearings at varying distances from the chamber, a branched conduit leading from the chamber to the bearings, and flow proportioning devices in said branches to compensate for variations in the discharge pressure from the chamber to the different bearings.

9. A lubricating system comprising a plurality of bearings, a flow control device at each bearing, a distributing system connected with each of said flow control devices and a chamber, a source of lubricant under pressure, a manually operated valve to permit of periodically introducing a predetermined quantity of lubricant from said source into said chamber, resilient means in said chamber adapted to be displaced by the introduction of lubricant and adapted to expel the predetermined quantity of lubricant from the chamber into the distributing system.

10. In a device of the class described, a bearing, means for lubricating said bearing comprising a source of supply, a conduit connected at one end to the bearing, a valve controlling communication between the other end of said conduit and the source of supply, manual means for opening said valve, automatic means to prevent the closing of said valve until a predetermined quantity of lubricant has passed therethrough, and automatic means for closing said valve when the said predetermined quantity has passed through the valve.

11. In a device for lubricating the chassis bearings of automobiles of the type having an oil pump to supply oil under pressure to the bearings of the motor, means for conducting oil under pump pressure to a valve mechanism, a chamber having an inlet and an outlet each in communication with said valve mechanism discharging oil under varying pressure, a conduit leading from said valve mechanism and having branches, each of said branches leading to a part to be lubricated, and flow control devices in each of said branches, to compensate for variations in the discharge pressure from the chamber to the different bearings, said flow control devices being adapted to permit a flow therethrough of lubricant under pressure.

12. A lubricating system comprising a source of lubricant under pressure, a storage chamber, valve controlled means for conducting the lubricant to the storage chamber, means constantly urging said valve to closed position, means for opening said valve and means to prevent the closing of said valve after it has been opened, until a pressure has been built up in the storage chamber to a point approaching the pressure in the source.

13. In a device of the class described, a chamber, a conduit, a valve controlling communication between said chamber and said conduit, means for opening said valve and means for closing said valve and means to prevent the operation of the valve closing means except when the pressure in the chamber is substantially the same as the pressure in the conduit.

14. In a device of the class described a storage chamber, a conduit, a valve mechanism controlling communication between said storage chamber and said conduit, said mechanism including a valve chamber surrounding said valve and having a cylindrical portion, said valve having fixed thereto a portion comprising a piston, slidable in said cylinder, an opening from one end of said cylindrical portion into said chamber, an opening from the conduit into the valve chamber at a point spaced axially from the first named opening, and an opening from the valve chamber into the storage chamber, substantially opposite the last named opening.

15. A lubricating system including a pump, a storage chamber receiving a predetermined lubricant charge, and a part to be lubricated, a conduit connecting the storage chamber with the part to be lubricated, a conduit connecting the storage chamber with the pump, a valve in each of said conduits, interconnected so that one valve is closed while the other is opened, and manual operating means for initially operating both of said valves, and automatic means to control subsequent operation of said valves.

16. A lubricating system including a source of lubricant under pressure, a storage chamber receiving and discharging a predetermined lubricant charge, and a part to be lubricated, a conduit connecting the storage chamber with the part to be lubricated, a conduit connecting the storage chamber with the source of lubricant, a valve in each of said conduits, interconnected so that one valve is closed while the other is opened, positive operating connection between said valves, and means for operating said valves independently of the pump.

17. In a chassis lubricating system, a storage chamber having resilient means therein, a conduit connecting the storage chamber with the lubricating system of the engine of the chassis, a manually operated valve controlling communication between said conduit and said chamber, whereby when said valve is opened a predetermined charge of lubricant will flow into said chamber until a pressure is built up in the chamber substantially equal to the pressure in the lubricating system of the motor.

18. In an automatic chassis lubricating system for an automobile of the type having a pressure lubricating system for the engine bearings, a storage chamber having resilient means therein, a distributing conduit connecting the storage chamber with the chassis bearings, said chamber having an inlet opening, a manually operated valve for controlling said opening, a connection between said valve and the pressure system of the engine, whereby when said valve is opened a predetermined charge of lubricant will flow into the said chamber until the pressure in said chamber is substantially equal to the pressure in the system, and means at each of the chassis bearings to control the discharge of lubricant thereto.

19. In a device of the class described, a storage chamber, a conduit, a valve mechanism controlling communication between said storage chamber and said conduit, said mechanism including a valve chamber surrounding said valve and having a cylindrical portion, a piston fixed to said valve and slidable in said cylinder, an opening between said cylindrical portion and said storage chamber at a point beyond the stroke of said piston, an opening from the conduit into said cylindrical portion in the space covered by the piston stroke, and away from said first named opening and adapted to be covered by said piston at one end of its stroke and an opening of comparatively restricted area from the cylindrical portion into the storage chamber opposite said last named opening.

20. In a chassis lubricating system for an automobile of the type having a pressure lubricating system for the engine bearings, a storage chamber having resilient means therein, a conduit connecting the storage chamber with the said pressure system, a valve controlling communication between said conduit and said chamber, manual means for opening said valve to permit lubricant to flow into the said chamber and means operated by said pressure to resist the closing of said valve, until the pressure in the chamber rises to a degree approaching the pressure of the system.

21. In a chassis lubricating system for an automobile of the type having a pressure lubricating system for the engine bearings, a storage chamber having resilient means therein, a distributing conduit connecting the storage chamber with the chassis bearings, said chamber having an inlet opening, a manually operable valve for controlling said opening, resilient means tending to close said valve, means operated by the pressure in the chamber, tending to close said valve, means tending to resist the closing of said valve and a connection between said valve and the pressure system of the engine, whereby when the said valve is opened lubricant will flow into the chamber until the difference between the pressures in the chamber and in the system become less than a predetermined amount.

22. In a chassis lubricating system for automobiles of the type having an oil pump to supply oil under pressure to the bearings of the motor, an air chamber having an inlet and an outlet, means for conducting oil under pump pressure to the inlet end of said air chamber, a conduit connected to the outlet of said air chamber to conduct the oil to bearings, a normally closed inlet valve and a normally open outlet valve controlling respectively the inlet and the outlet of said air chamber, resilient means tending to hold said valves in normal position, means operable to displace said resilient means and to close said outlet valve and to open said inlet valve, said inlet valve having a portion exposed on one side to the pressure of the pump when the valve is open, but substantially cut off from said pressure when the valve is closed, said portion having its other side exposed to any existing pressure in the air chamber, whereby when the inlet valve is opened it will be caused to remain in open position, allowing oil to flow into the chamber, and to compress the air therein until the pressure within the chamber rises to such a degree that the combined force of the resilient means and the pump pressure is sufficient to close the inlet valve and open the outlet valve, to allow the compressed air in the chamber to discharge the lubricant therefrom through the conduit to the bearings.

23. In a central lubricating system, a receiving chamber having an inlet and an outlet, resilient means in said chamber adapted to be compressed by the introduction of lubricant thereto and to subsequently discharge the same under pressure, valve means controlling said outlet and having two operating positions in one of which the valve is closed and in the other of which the valve is open, mechanically operated pump means for delivering lubricant under pressure to said inlet, conduit means leading from said outlet to deliver lubricant to points requiring lubrication, flow control means at each of said points adapted to regulate the discharge of lubricant thereto and capable of proportioning the discharge of lubricant at each point, irrespective of the relative resistance to discharge at the several points and of the relative resistance in the conduit between said points and the pump; means for shifting said valve mechanism to said first named position, and automatic means operative upon the introduction of a predetermined quantity of lubricant into said chamber to shift the valve mechanism to the said second position, whereby a substantially predetermined quantity of lubricant will be discharged at each of the points requiring lubrication.

24. In a device of the class described, a plurality of bearings requiring lubrication, a supply conduit, metering devices adjacent said bearings connected to said supply conduit and adapted to control the discharge therefrom to the bearings, a central receiving chamber adapted to intermittently discharge quantities of lubricant suited to the needs of the bearings at varying pressure into said conduit, said central chamber having an inlet, a resilient medium in said chamber adapted to be displaced by lubricant forced into the inlet under pressure, and valve means controlling communication between the chamber and the supply conduit, said devices being provided with restriction means and adjusting means for said restriction means to provide a decreased restriction with lower pressures and an increased restriction with higher pressures.

25. In a lubricating device for bearings, a plurality of outlet devices; discharge control means in each device including a cylindrical bore through which the lubricant discharged by that device must pass, a member longitudinally movable in said bore and not quite filling it during discharge of lubricant through the device, said member forming with the bore a highly restricted passage for lubricant, spring means in each device for biasing the said members toward the inlet ends thereof, said devices each including means to check return flow, a conduit connecting said devices, a measuring chamber having an outlet connected to said conduit and an inlet, means for forcing lubricant into said inlet under pressure, a valve controlling said outlet, and lubricant pressure operated means for operating said valve when a predetermined quantity of lubricant has been forced into said chamber.

26. In a lubricating device for bearings, a plurality of outlet devices; discharge control means in each device, a conduit connecting said devices, a measuring chamber having an outlet connected to said conduit and an inlet, means for forcing lubricant into said inlet under pressure, a piston valve controlling said outlet, and lubricant pressure operated means for operating said valve when a predetermined quantity of lubricant has been forced into said chamber.

27. In a lubricating system a source of lubricant, a pump adapted to receive lubricant from said source, an accumulator device adapted to receive and retain a predetermined quantity of lubricant from said pump, pressure operated means for discharging the lubricant from the accumulator when a predetermined quantity is stored in the accumulator, and a piping system including control devices for supplying lubricant to individual bearings and adapted to intermittently receive lubricant from the accumulator device, said piping system being provided with means whereby it will be maintained substantially filled with lubricant between discharges from the accumulator.

28. In a central lubricating system, a receiving chamber having an inlet and an outlet, valve means controlling said outlet and having two operating positions, in one of which the valve is closed, and in the other of which the valve is open, mechanically operated pump means for delivering lubricant under pressure to said inlet, conduit means leading from said outlet to deliver lubricant to points requiring lubrication, means for shifting said valve mechanism to said first named position, and automatic pressure controlled means operative upon the introduction of a predetermined quantity of lubricant into said chamber to shift the valve mechanism to the said second position.

29. In a lubricating device for bearings, a plurality of outlet devices; discharge control means in each device, a conduit connecting said devices, a measuring chamber having an outlet connected to said conduit and an inlet, means for forcing lubricant into said inlet under pressure, a valve controlling said outlet, and lubricant pressure operated means for operating said valve when a predetermined quantity of lubricant has been forced into said chamber.

30. In a lubricating device for bearings, a plurality of outlet devices; discharge control means in each device, a conduit connecting said devices, a measuring chamber having an outlet connected to said conduit and an inlet, means for forcing lubricant into said inlet under pressure, a lubricant pressure controlled valve controlling said outlet, and means for operating said valve when a predetermined quantity of lubricant has been forced into said chamber.

31. A central lubricating system comprising a resiliently cushioning receiving chamber having associated therewith an inlet port and an outlet port, a horizontally reciprocating valve device controlling said outlet port, mechanically operated pump mean for delivering lubricant under pressure through said inlet port, branched conduit means leading from said outlet port to deliver lubricant to points requiring lubrication, lubricant pressure-responsive metering means determining the emission to said respective points, means for shifting said valve device to closed position, and automatic means to propel the valve device of the lubricant charged chamber to wide open position, thereby to permit resilient propulsion of lubricant therefrom into the branched conduit means.

32. An automatic lubricating system comprising a plurality of bearings, a flow control device at each bearing, a distributing system connected with each of said flow control devices, a chamber, a source of lubricant under pressure, an inlet connection provided with a manually operated valve for periodically permitting the introduction of a predetermined quantity of lubricant from said source into said chamber, resilient means in said chamber adapted to be displaced by the introduction of lubricant and adapted to expel the predetermined quantity of lubricant from the chamber into the distributing system, said chamber expelling lubricant into the distributing system at a decreasing pressure and means being provided in said flow control devices for varying the resistance to flow inversely with the pressure.

33. A central lubricating installation for a plurality of spaced bearings comprising a branched piping system with metering outlets to the bearings, a reservoir, provided with a resilient discharge, pump means periodically to supply lubricant to said reservoir and manually initiated and automatically controlled means to control the flow from said pump means to said reservoir and to said system including a piston valve including an elongated valve stem moved by the piston of said valve, inlet and outlet means associated with said reservoir controlled by said valve, resilient means to bias said valve to close said inlet means and open said outlet means and operating means to bias said valve to open said inlet means and close said outlet means.

34. A central lubricating installation for a plurality of spaced bearings comprising a branched piping system with metering outlets to the bearings, a reservoir, means to supply lubricant to said reservoir and means to control the flow from said reservoir to said system including a valve, an inlet and an outlet for said reservoir opened and closed by said valve and means to operate said valve to open said inlet and close said outlet, said valve and said reservoir being respectively provided with resilient means, one of said resilient means serving to bias said valve to close said inlet and to open said outlet, and to resist operation by said operating means and the other resilient means being stressed upon supply by said supply means and causing flow from said reservoir to said system upon opening of said outlet.

35. A central lubricating installation for a plurality of spaced bearings comprising a branched piping system with metering outlets to the bearings, a reservoir, means to supply lubricant to said reservoir under pressure and means to control the flow of lubricant from said reservoir to said system, said means including a pressure operated valve, manual means to actuate said valve to permit communication between the supply means and the reservoir and automatic means to actuate said valve to permit communication between the reservoir and the piping system, said first mentioned communication being maintained after a manual opening by the pressure from the supply, and said first mentioned communication between the supply and the reservoir being cut off and said second mentioned communication being established between the reservoir and the system upon storage of a predetermined amount of lubricant.

36. A central lubricating installation for a plurality of spaced bearings comprising a piping system with metering outlets to the bearings, a source of continuous lubricant pressure, a resilient reservoir charged from said source of lubricant pressure supplying lubricant intermittently to said piping system, valve means to control the flow of lubricant from said reservoir to said piping system and resilient means controlling said last mentioned means to establish communication between said reservoir and said piping system when said reservoir has been charged to a predetermined pressure.

37. A central lubricating installation for a plurality of spaced bearings comprising a branched piping system with metering outlets to the bearings, a central source of lubricant pressure, a reservoir, means to alternately connect said reservoir to said source and to said piping system, said means including a piston valve actuated to cut off said reservoir from said piping system during connection of said reservoir to said source, a biasing spring tending to actuate said valve to connect said reservoir with said piping system, operating means for said valve to establish communication between said reservoir and said source and means for overcoming said spring during the supply of lubricant from said source to said reservoir.

38. A lubricating system comprising a source of lubricant under pressure, a chamber, a bearing, conduits connecting the chamber with the bearing and with the source, valve means in said conduits and adapted to be moved to open and closed positions, said valve means including valve elements in each of the said conduits, a connection between said valve elements to open one valve when the other is closed, automatic means tending to move said valve means to one of said positions, manual means for moving said valve means to the other of said positions, and means set in operation upon the movement of the valve means to the last mentioned position, to temporarily prevent the operation of the automatic means to return it to the other position.

39. In a lubricating system for a motor vehicle having a plurality of bearings, supply tubes leading to the bearings, means for storing lubricant under pressure communicating with said tubes, power operated lubricant supply means for providing lubricant under pressure, a valve for resisting the fluid pressure from said supply means, a plunger for actuating said valve to admit lubricant to said storing means and manually operable means extending into convenient reach of the operator for actuating said plunger.

40. In a lubricating system for a motor vehicle having a plurality of bearings, a supply tube leading to said bearings, means for storing lubricant under pressure communicating with said tube, a supply pump for supplying lubricant to said storing means, a valve normally preventing the fluid from the supply pump from entering said storing means, a plunger adapted to actuate said valve allowing fluid from the supply pump to enter the storing means, and a spring to close said valve.

41. In a lubricating system for a motor vehicle having a plurality of bearings, a pneumatic pressure means for supplying lubricant to the bearings, motor operated means for supplying lubricant to said pressure means, said pressure means deriving energy from said motor operated means, a valve normally preventing the flow of lubricant from the motor operated means to said pressure means and a manual control mounted upon the dashboard of the vehicle for opening said valve thereby to render said motor operated means effective for supplying lubricant to said pressure means.

42. In a lubricating system for a motor vehicle having a plurality of bearings, a lubricant line leading to the bearings, restricting means adjacent said bearings, a pneumatic chamber communicating adjacent its bottom with a passageway communicating with the line, motor operated means for supplying lubricant to said chamber under pressure, a valve comprising a valve seat, a valve member and a spring for engaging the member with the seat, said valve being interposed between the pneumatic chamber and said motor operated means, and means for actuating said valve to admit lubricant from said motor operated means into said chamber and said line whereby the lubricant will be gradually forced to said bearings.

GEORGE L. MOORE.